US012789429B2

(12) United States Patent
Nakayama

(10) Patent No.: US 12,789,429 B2
(45) Date of Patent: Nov. 10, 2026

(54) INJECTION NOZZLE, INJECTION DEVICE, AND INJECTION MOLDING MACHINE

(71) Applicant: THE JAPAN STEEL WORKS, LTD., Tokyo (JP)

(72) Inventor: Kiyotaka Nakayama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 129 days.

(21) Appl. No.: 18/764,709

(22) Filed: Jul. 5, 2024

(65) Prior Publication Data

US 2025/0010529 A1 Jan. 9, 2025

(30) Foreign Application Priority Data

Jul. 7, 2023 (JP) ................................ 2023-112656

(51) Int. Cl.
*B29C 45/20* (2006.01)
*B29C 45/78* (2006.01)

(52) U.S. Cl.
CPC .............. *B29C 45/20* (2013.01); *B29C 45/78* (2013.01); *B29C 2945/7604* (2013.01); *B29C 2945/7621* (2013.01)

(58) Field of Classification Search
CPC . B29C 45/20; B29C 45/78; B29C 2945/7604; B29C 2945/7621
USPC .......................................................... 425/169
See application file for complete search history.

(56) References Cited

FOREIGN PATENT DOCUMENTS

| | | | | |
|---|---|---|---|---|
| EP | 0307482 A1 * | 3/1989 | ............. | B29C 45/74 |
| JP | 5809337 B1 * | 11/2015 | | |
| JP | 2023-030519 A | 3/2023 | | |

OTHER PUBLICATIONS

English abstract of JP5809337 (Year: 2015).*

* cited by examiner

*Primary Examiner* — Christina A Johnson
*Assistant Examiner* — Xue H Liu
(74) *Attorney, Agent, or Firm* — Potomac Law Group, PLLC

(57) ABSTRACT

An injection nozzle to be attached to a tip end of a heating cylinder of an injection device includes a temperature sensor measuring a temperature in a rear end portion of the injection nozzle to be attached to the heating cylinder. The injection nozzle has a groove formed in an outer peripheral surface from a vicinity of the rear end portion toward a tip end of the injection nozzle in a longitudinal direction, and a sensor hole formed in the vicinity of the rear end portion continuously from the groove. The rear end portion temperature sensor includes a sensor device at a distal end, which is inserted into the sensor hole, and a conductive wire portion housed along the groove near the distal end and extending outwardly in a vicinity of a central portion of the injection nozzle.

16 Claims, 7 Drawing Sheets

INJECTION NOZZLE, INJECTION DEVICE, AND INJECTION MOLDING MACHINE

CROSS-REFERENCE TO RELATED APPLICATIONS

This application is based on and claims priority under 35 USC 119 from Japanese Patent Application No. 2023-112656 filed on Jul. 7, 2023, the entire content of which is incorporated herein by reference.

TECHNICAL FIELD

The present disclosure relates to an injection nozzle provided in an injection molding machine, an injection device including the injection nozzle, and the injection molding machine.

BACKGROUND

An injection device of an injection molding machine includes a heating cylinder and a screw placed in the heating cylinder, and an injection nozzle is provided at a tip end of the heating cylinder. A heater is provided in the heating cylinder and the injection nozzle, and a temperature sensor including a thermocouple is embedded therein. The heater is controlled based on a temperature measured by the temperature sensor.

SUMMARY

The temperature sensor can be embedded in a desired position. For example, when measuring the temperature of a rear end portion of the injection nozzle, that is, a part near the heating cylinder, it is necessary to perform as described in JP2023-30519A. The injection nozzle is attached to the heating cylinder by an attachment fixing member such as a cylinder head. When the injection nozzle is attached by the cylinder head, the rear end portion is housed in the cylinder head. Therefore, when the temperature sensor is provided in the vicinity of the rear end portion of the injection nozzle, a hole is formed from an outer peripheral surface of the cylinder head to reach the rear end portion of the injection nozzle, and a hole is also formed at the rear end portion of the injection nozzle. These holes are aligned with each other and the temperature sensor is inserted. Thus, the temperature in the vicinity of the rear end portion of the injection nozzle can be measured. However, when a hole is not desired to be formed in the attachment fixing member such as a cylinder head, there is a problem in that the temperature sensor cannot be attached.

The present disclosure provides an injection nozzle capable of measuring the temperature of a rear end portion of the injection nozzle without forming a hole in an attachment fixing member for attaching the injection nozzle to a heating cylinder.

Other problems and novel features will become apparent from description of the present description and the accompanying drawings.

An injection nozzle is attached to a tip end of a heating cylinder of an injection device by a predetermined attachment fixing member. In the present disclosure, a groove having a predetermined length is formed on an outer peripheral surface from the vicinity of a rear end portion of the injection nozzle toward a tip end of the injection nozzle in a longitudinal direction. A sensor hole having a predetermined depth is formed in the vicinity of the rear end portion continuously with the groove. The injection nozzle is provided with a rear end portion temperature sensor configured to measure a temperature in the rear end portion thereof. The rear end portion temperature sensor includes a sensor device at a distal end and a conductive wire portion, the sensor device is inserted into a sensor hole, and a conductive wire portion is housed along the groove and extends outwardly in the vicinity of a central portion of the injection nozzle.

According to the present disclosure, the temperature at the rear end portion of the injection nozzle can be measured without forming a hole in the attachment fixing member to which the injection nozzle is attached.

DETAILED DESCRIPTION

Figure 1:
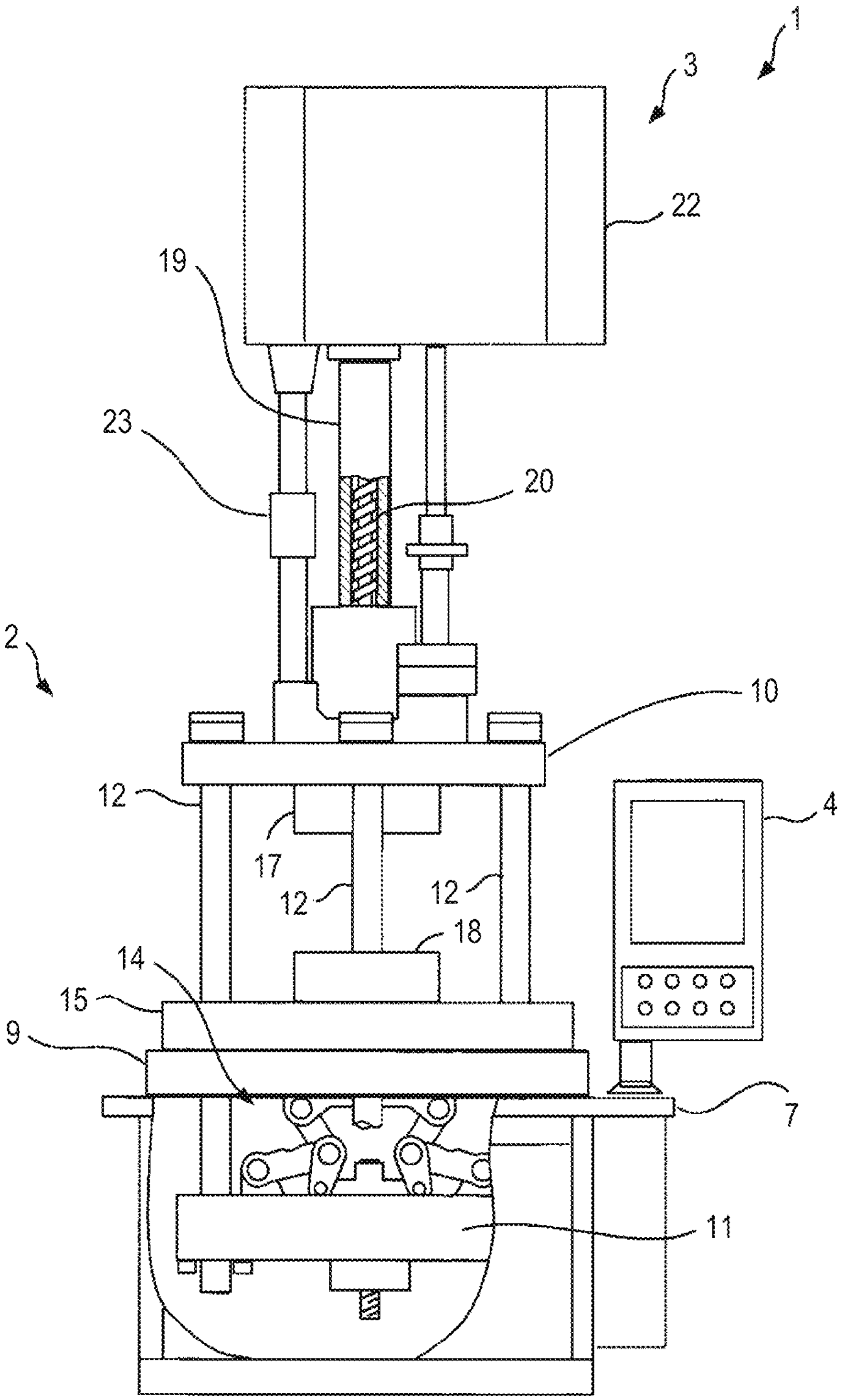
FIG. 1 is a front view showing an injection molding machine according to a first illustrative embodiment.

Hereinafter, specific illustrative embodiments will be described in detail with reference to the drawings. The present disclosure is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

First Illustrative Embodiment

{Injection Molding Machine}

Figure 2:
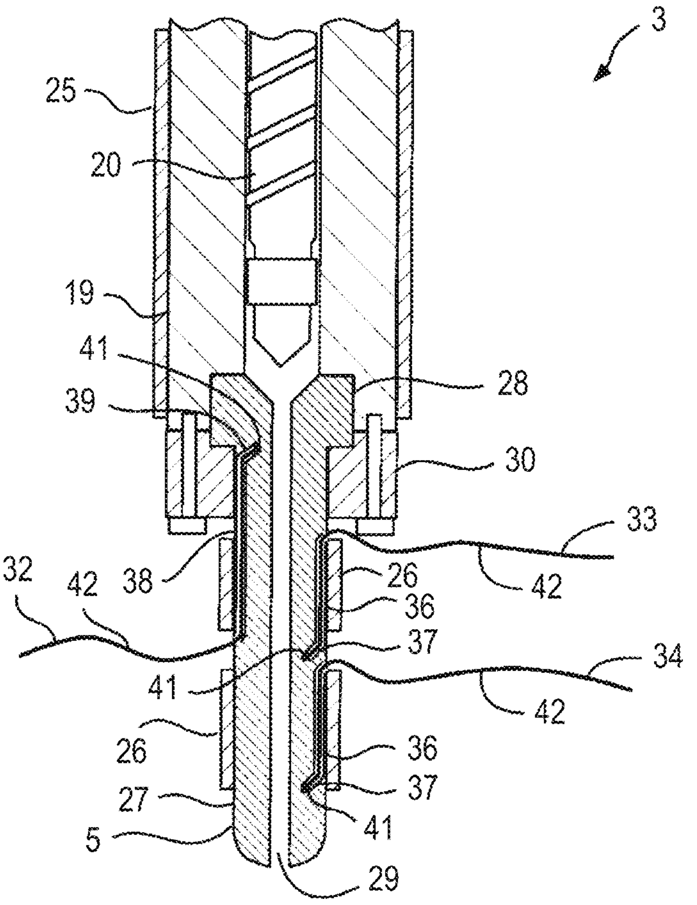
FIG. 2 is a front cross-sectional view showing a part of the injection device and an injection nozzle according to the first illustrative embodiment.
Figure 3:
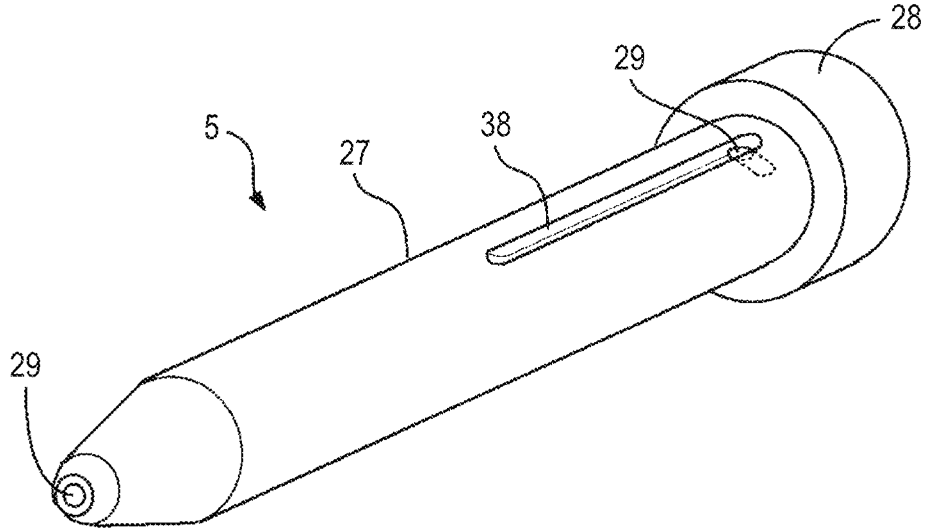
FIG. 3 is a perspective view of the injection nozzle according to the first illustrative embodiment.

As shown in FIG. 1, an injection molding machine 1 according to a first illustrative embodiment is a so-called vertical injection molding machine. An injection nozzle 5 according to the first illustrative embodiment, which will be described in detail later with reference to FIGS. 2 and 3, is provided in this vertical injection molding machine, but it may also be provided in a horizontal injection molding machine. The type of injection molding machine is not limited. The injection molding machine 1 according to the first illustrative embodiment includes a toggle-type mold clamping device 2, an injection device 3, and a control device 4. The control device 4 is configured to control the mold clamping device 2, the injection device 3, and the like.

{Mold Clamping Device}

The mold clamping device 2 is a so-called vertical mold clamping device. The mold clamping device 2 includes a fixed platen 9 fixed to a bed 7, an upper movable platen 10 provided above the fixed platen 9, and a lower movable platen 11 provided in the bed 7. The upper movable platen 10 and the lower movable platen 11 are coupled by three tie bars 12, 12, . . . . A toggle mechanism 14 is provided between the lower movable platen 11 and the fixed platen 9. A turntable 15 is provided on the fixed platen 9. An upper mold 17 is provided on the upper movable platen 10. A lower mold 18 is provided on the turntable 15. When the toggle mechanism 14 is driven, the upper mold 17 and the lower mold 18 are opened and closed.

{Injection Device}

The injection device 3 is provided above the upper movable platen 10 of the mold clamping device 2. The injection device 3 includes a heating cylinder 19, a screw 20 provided in the heating cylinder 19, a screw driving device 22, and an elevating device 23 for elevating the entire injection device 3. As will be described in detail later, the heating cylinder 19 has an injection nozzle 5 according to the first illustrative embodiment as shown in FIG. 2. The heating cylinder 19 is provided with heaters 25, 25, . . . , and the injection nozzle 5 is provided with nozzle heaters 26, 26, . . .

{Injection Nozzle}

As shown in FIGS. 2 and 3, the injection nozzle 5 according to the first illustrative embodiment includes a relatively long cylindrical body portion 27 and a flange portion 28 having an enlarged diameter. The injection nozzle 5 has a resin flow path 29 formed in an axial center. The flange portion 28 is formed on a rear end side of the injection nozzle 5, that is, on the side to be attached to the heating cylinder 19. As shown in FIG. 2, the injection nozzle 5 is attached to the heating cylinder 19 with the flange portion 28 being pressed by a cylinder head 30. The cylinder head 30 is an attachment fixing member for attaching the injection nozzle 5 to the heating cylinder 19.

As shown in FIG. 2, the injection nozzle 5 is provided with a rear end portion temperature sensor 32, a central portion temperature sensor 33, and a tip end portion temperature sensor 34. The rear end portion temperature sensor 32 is configured to measure the temperature in the vicinity of the flange portion 28, that is, in the vicinity of a rear end portion. The central portion temperature sensor 33 is configured to measure the temperature in the vicinity of a central portion. The tip end portion temperature sensor 34 is configured to measure the temperature in the vicinity of a tip end portion. Of the temperature sensors 32, 33, and 34, the central portion temperature sensor 33 and the tip end portion temperature sensor 34 are provided in an exposed portion of the injection nozzle 5, that is, a portion not covered by the cylinder head 30. Therefore, the injection nozzle 5 is attached in the same manner as an injection nozzle in the related art.

That is, grooves 36 and 36 of a predetermined length are formed on an outer peripheral surface of the body portion 27 of the injection nozzle 5, and sensor holes 37 and 37 of a predetermined depth are formed continuously from the grooves 36 and 36. The grooves 36 and 36 are disposed on a rear side of the sensor holes 37 and 37. The central portion temperature sensor 33 and the tip end portion temperature sensor 34 are disposed such that conductive wire portions 42 enter the grooves 36 and 36, extend forward of the injection nozzle 5, and then sensor units 41 at distal ends are inserted into the sensor holes 37 and 37. The sensor unit 41 may be a sensor device configured by, for example, a temperature sensing element.

On the other hand, the rear end portion temperature sensor 32 measures the temperature at a portion of the injection nozzle 5 covered with the cylinder head 30, that is, in the vicinity of the rear end portion. That is, the cylinder head 30 interferes with the attachment of the rear end portion temperature sensor 32. Therefore, in the injection nozzle 5 according to the first illustrative embodiment, a method of attaching the rear end portion temperature sensor 32 is devised. Specifically, it is as follows. First, as shown in FIG. 3, a groove 38 of a predetermined depth is formed on the outer peripheral surface of the body portion 27 of the injection nozzle 5 from the vicinity of the flange portion 28, that is, from the vicinity of the rear end portion toward a tip end in a longitudinal direction. A sensor hole 39 of a predetermined depth is formed in the vicinity of the flange portion 28 continuously with the groove 38. That is, the groove 38 is disposed on a tip end side, that is, on a front side of the sensor hole 39. In this illustrative embodiment, the groove 38 has a length extending to the vicinity of the center of the body portion 27. Alternatively, the groove may be formed to extend to the tip end of the injection nozzle 5.

As shown in FIG. 2, the sensor unit 41 at the distal end of the rear end portion temperature sensor 32 is inserted into the sensor hole 39. A distal end portion of the conductive wire portion 42 of the rear end portion temperature sensor 32 near the sensor unit 41 is housed in the groove 38 and drawn out to the outside in the vicinity of a central portion of the injection nozzle 5. Alternatively, the rear end portion temperature sensor 32 may be disposed such that the conductive wire portion 42 enters the groove 38 from the vicinity of the central portion of the injection nozzle 5 toward the rear end portion, and the sensor unit 41 at the distal end enters the sensor hole 39. In this way, the rear end portion temperature sensor 32 is provided in the injection nozzle 5, so that it is not necessary to form a hole for the rear end portion temperature sensor 32 in the attachment fixing member covering the flange portion 28, that is, the cylinder head 30, as in the comparative example described below.

COMPARATIVE EXAMPLE

Figure 4:
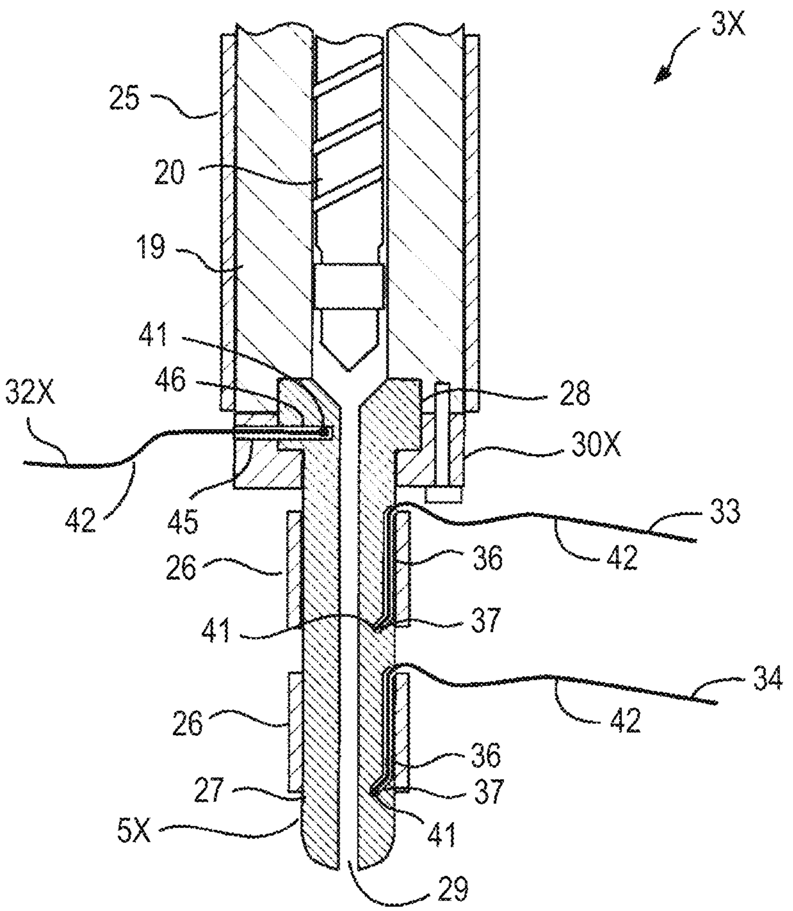
FIG. 4 is a front cross-sectional view showing a part of an injection device and an injection nozzle according to a comparative example.

In order to understand that the attachment method of the rear end portion temperature sensor 32 is excellent in the injection nozzle 5 according to the first illustrative embodiment, an injection device 3X to which an injection nozzle 5X according to a comparative example is attached will be described with reference to FIG. 4. Although some of the members forming the injection device 3X according to the comparative example are different from those in the first illustrative embodiment, most of the members are formed similarly to the injection device 3 according to the first illustrative embodiment. The same members are denoted by the same reference numerals, and description thereof is omitted. Similarly, regarding the members and configurations of the injection nozzle 5X according to the comparative example, the same reference numbers are given to the same members and configurations as those of the injection nozzle 5 according to the first illustrative embodiment, and the description thereof will be omitted.

The injection nozzle 5X according to the comparative example is also attached to the heating cylinder 19 by a cylinder head 30X, but the cylinder head 30X has a sensor insertion hole 45 for inserting a rear end portion temperature sensor 32X. A sensor hole 46 is formed in the injection nozzle 5X so as to align with the sensor insertion hole 45. The rear end portion temperature sensor 32X is inserted through the sensor insertion hole 45, and the sensor unit 41 is inserted into the sensor hole 46.

In the injection device 3X according to the comparative example, the temperature in the vicinity of the rear end portion of the injection nozzle 5X can also be measured by the rear end portion temperature sensor 32X. However, it is necessary to form the sensor insertion hole 45 in the cylinder head 30X. When the position of the rear end portion temperature sensor 32X is changed, there is a problem in that it is necessary to newly form another sensor insertion hole 45 in order to change the position of the sensor insertion hole 45. Further, there is another problem. In order to insert the rear end portion temperature sensor 32X, it is necessary to align the sensor insertion hole 45 with the sensor hole 46. To achieve alignment, a rotational position of the injection nozzle 5X relative to the cylinder head 30X has to be adjusted. That is, attachment of the injection nozzle 5X to the heating cylinder 19 is complicated.

Second Illustrative Embodiment

{Injection Molding Machine}

A second illustrative embodiment will be described with reference to FIGS. 5 and 6. In the injection molding machine 1 according to the second illustrative embodiment, the mold clamping device 2 and the control device 4 are configured similarly to the mold clamping device 2 and the control device 4 in the injection molding machine 1 according to the first illustrative embodiment shown in FIG. 1. Therefore, the description thereof will be omitted. Regarding an injection device 3A, an attachment fixing member for attaching the injection nozzle 5 to a heating cylinder 19A is different. However, other components of the injection device 3A are configured in the same manner as in the first illustrative embodiment. The injection nozzle 5 is also configured in the same manner as in the first illustrative embodiment, and the description thereof is omitted.

{Injection Nozzle Attachment Adapter}

Figure 5:
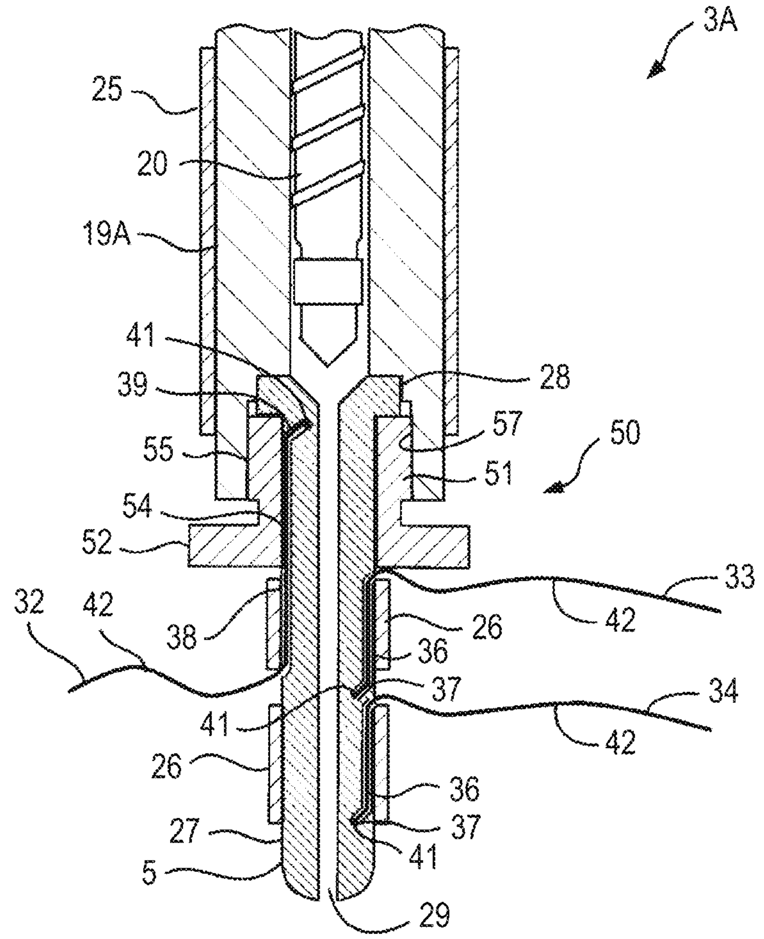
FIG. 5 is a front cross-sectional view showing a part of an injection device and an injection nozzle according to a second illustrative embodiment.
Figure 6:
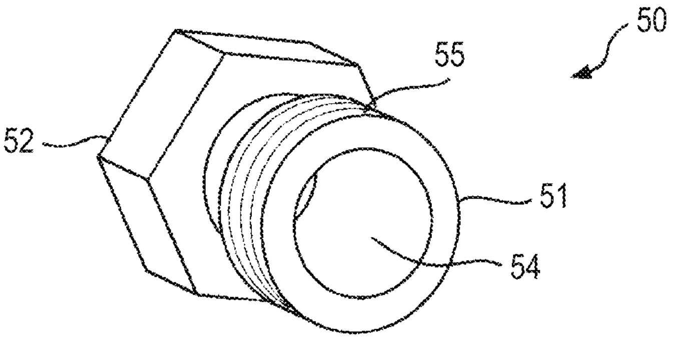
FIG. 6 is a perspective view showing an attachment fixing member according to the second illustrative embodiment for attaching the injection nozzle to a heating cylinder.

As shown in FIG. 5, the injection device 3A according to the second illustrative embodiment includes the attachment fixing member, which is an injection nozzle attachment adapter 50, attaches the injection nozzle 5 to the heating cylinder 19A. As shown in FIG. 6, the injection nozzle attachment adapter 50 includes a cylindrical portion 51 and a hexagonal nut-shaped fastening portion 52. The injection nozzle attachment adapter 50 has a through hole 54 formed in the axial direction. A male thread 55 is formed on an outer peripheral surface of the cylindrical portion 51. The male thread 55 is adapted to be screwed into a female thread 57 formed at a tip end of the heating cylinder 19A. The fastening portion 52 is provided to rotate and fasten the injection nozzle attachment adapter using a spanner or the like.

Figure 7A:
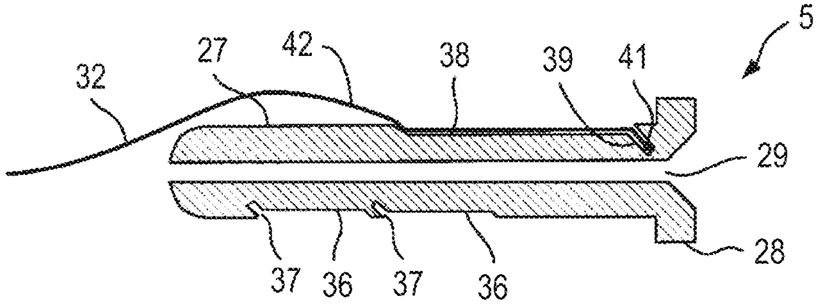
FIG. 7A is a front sectional view showing the injection nozzle according to the second illustrative embodiment.
Figure 7B:
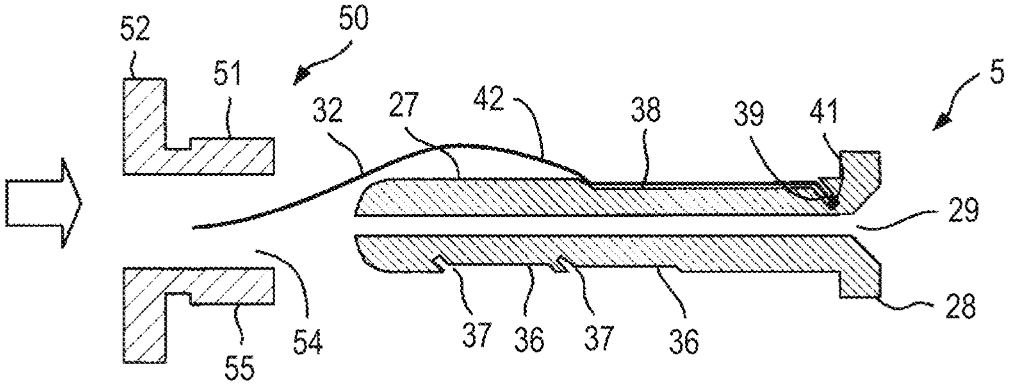
FIG. 7B is a front sectional view showing the injection nozzle and the attachment fixing member according to the second illustrative embodiment.

A method of attaching the injection nozzle 5 to the heating cylinder 19A according to the second illustrative embodiment will be described. First, as shown in FIG. 7A, the rear end portion temperature sensor 32 is attached to the injection nozzle 5. That is, the sensor unit 41 at the distal end of the rear end portion temperature sensor 32 is housed in the sensor hole 39, and the distal end portion of the conductive wire portion 42 near the sensor unit 41 is housed in the groove 38. Next, as shown in FIG. 7B, the injection nozzle attachment adapter 50 is mounted on the injection nozzle 5. At this time, the conductive wire portion 42 of the rear end portion temperature sensor 32 is inserted into the through hole 54 of the injection nozzle attachment adapter 50. Alternatively, the rear end portion temperature sensor 32 may be provided in the injection nozzle 5 as shown in FIG. 7A in a state where the conductive wire portion 42 is inserted into the through hole 54 of the injection nozzle attachment adapter 50 in advance.

Figure 7C:
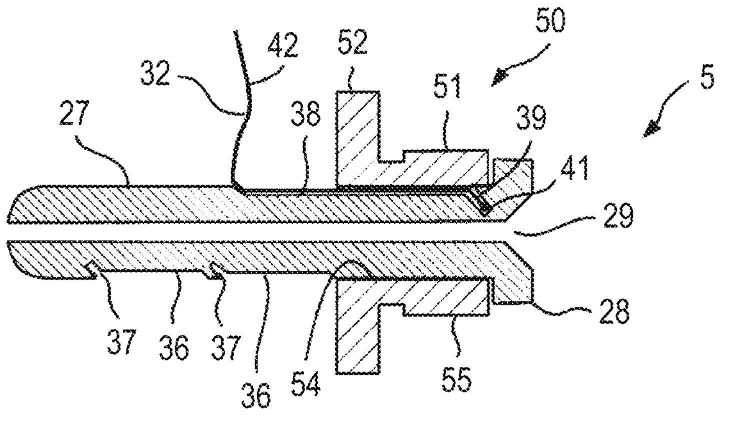
FIG. 7C is a front sectional view showing the injection nozzle and the attachment fixing member according to the second illustrative embodiment.

When mounting the injection nozzle attachment adapter 50 on the injection nozzle 5, a portion of the conductive wire portion 42 located at the tip end of the portion housed in the groove 38 is extended along the outer peripheral surface of the body portion 27 toward the tip end in the axial direction. In this case, the injection nozzle attachment adapter 50 is easily mounted on the injection nozzle 5. It has been described that the groove 38 may be formed up to the tip end of the injection nozzle 5. If the groove 38 is formed up to the tip end, the attachment becomes easier. FIG. 7C shows a state in which the injection nozzle attachment adapter 50 is mounted on the injection nozzle 5. In the state shown in FIG. 7C, the portion of the conductive wire portion 42 closer to the tip end than the portion housed in the groove 38 is appropriately bent.

Figure 7D:
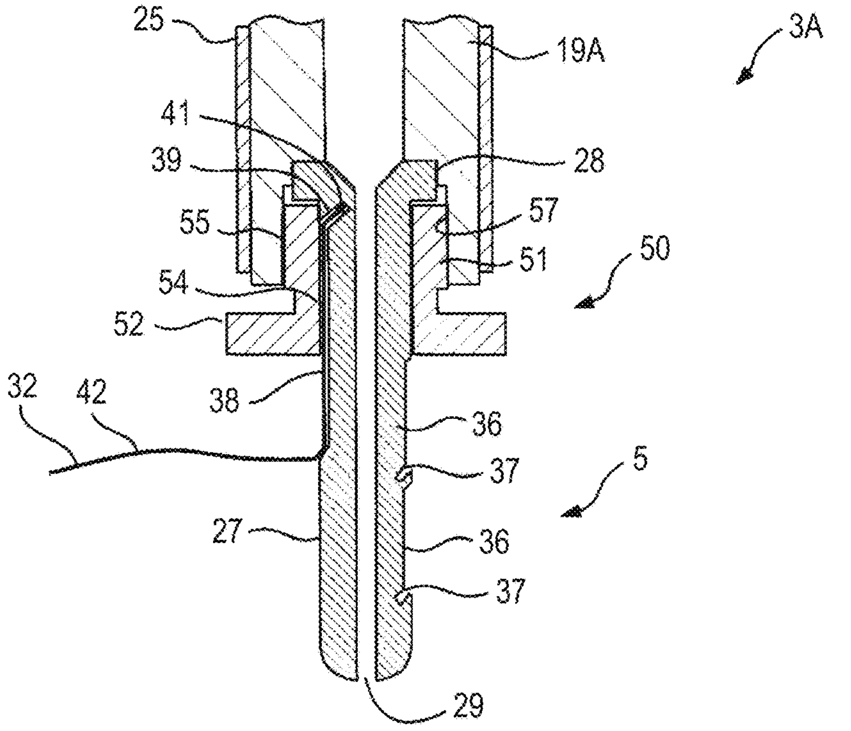
FIG. 7D is a front sectional view showing a part of the injection device, the injection nozzle, and the attachment fixing member according to the second illustrative embodiment.
Figure 7E:
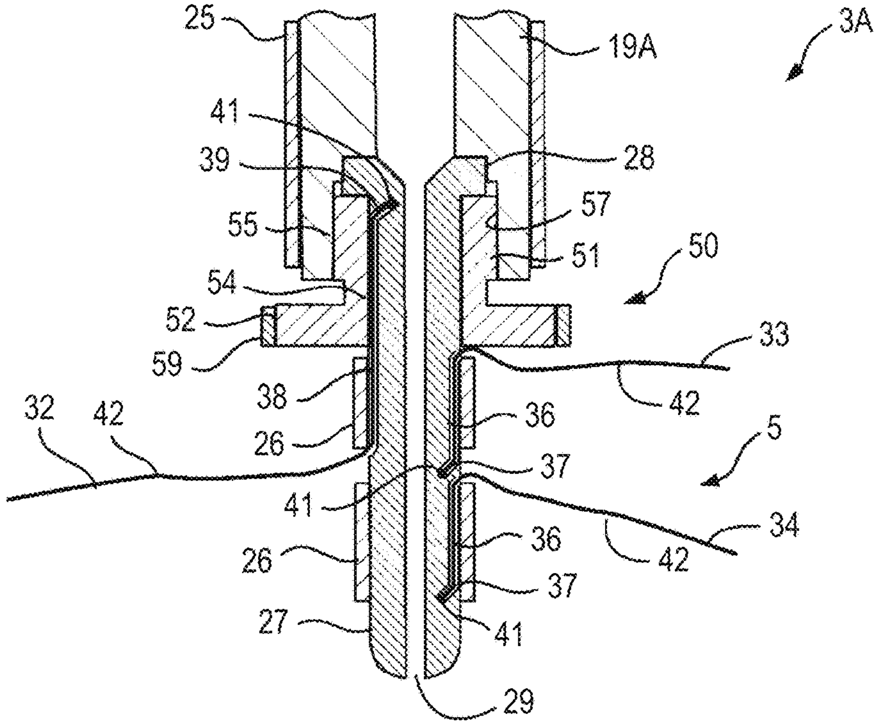
FIG. 7E is a front sectional view showing a part of the injection device, the injection nozzle, and the attachment fixing member according to the second illustrative embodiment.

As shown in FIG. 7D, the male thread 55 of the injection nozzle attachment adapter 50 is screwed into the female thread 57 formed in the heating cylinder 19A. Rotating and fastening the fastening portion 52 using a tool such as a spanner results in the attachment of the injection nozzle 5 to the heating cylinder 19A. Finally, as shown in FIG. 7E, the central portion temperature sensor 33 and the tip end portion temperature sensor 34 are attached to the injection nozzle 5, and the nozzle heaters 26, 26, . . . are attached to the injection nozzle 5. If necessary, an adapter heater 59 may be provided in the fastening portion 52 or the like of the injection nozzle attachment adapter 50. In the second illustrative embodiment, the rear end portion temperature sensor 32 is also provided without forming a hole in the attachment fixing member to which the injection nozzle 5 is attached, that is, the injection nozzle attachment adapter 50.

Third Illustrative Embodiment

{Injection Molding Machine}

Figure 8:
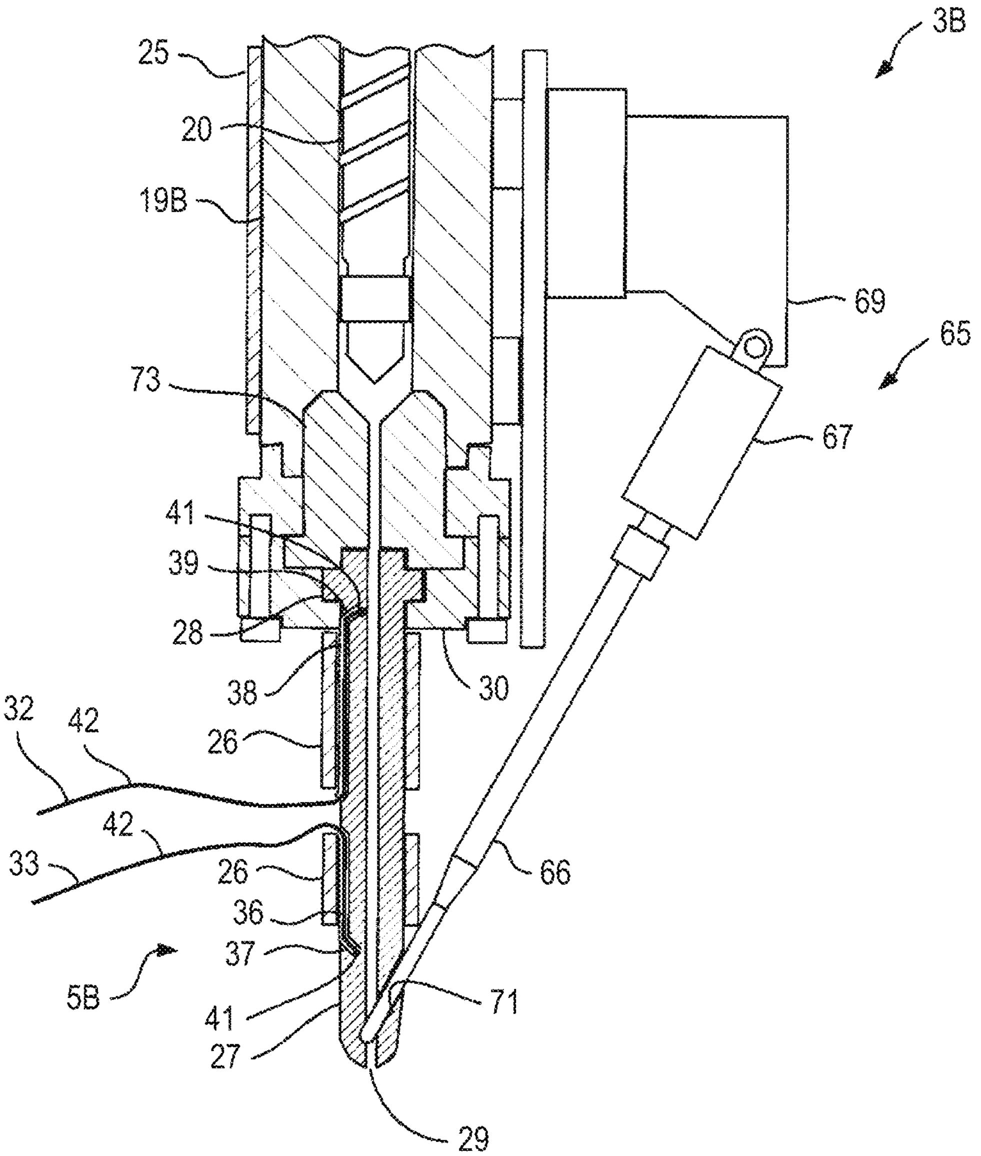
FIG. 8 is a front cross-sectional view of a part of an injection device and a shut-off nozzle according to a third illustrative embodiment.

A third illustrative embodiment will be described with reference to FIG. 8. In the injection molding machine 1 according to the third illustrative embodiment, the mold clamping device 2 and the control device 4 are configured similarly to the mold clamping device 2 and the control device 4 in the injection molding machine 1 according to the first illustrative embodiment shown in FIG. 1. Therefore, the description thereof will be omitted. An injection device 3B and an injection nozzle 5B are different from the injection device 3 according to the first illustrative embodiment in terms of several points. Only the differences will be described, and the same reference numerals will be given to the members configured in the same way as in the first illustrative embodiment, and the description thereof will be omitted.

The injection device 3B according to the third illustrative embodiment is different from the first illustrative embodiment in that a shut-off nozzle 65 is provided. The shut-off nozzle 65 includes the injection nozzle 5B, a needle valve 66, a cylinder unit 67 that drives the needle valve 66, and a support member 69 that supports the cylinder unit 67. The injection nozzle 5B has a structure similar to that of the injection nozzle 5 (see FIGS. 2 and 3) according to the first illustrative embodiment, but is different in two points. The first difference is that a diagonal needle hole 71 extending from the outer peripheral surface of the body portion 27 to the resin flow path 29 is formed in the injection nozzle 5B. The needle valve 66 is inserted into the needle hole 71 so as to be able to move forward and backward to open and close the resin flow path 29. The second difference is that only two temperature sensors 32 and 33 are provided, the rear end portion temperature sensor 32 and the central portion temperature sensor 33. That is, the tip end portion temperature sensor 34 (see FIG. 2) is not provided.

The third illustrative embodiment is different from the first illustrative embodiment in the method of attaching the injection nozzle 5B to the heating cylinder 19B. In the third illustrative embodiment, an injection nozzle attachment block 73 is provided at a tip end of the heating cylinder 19B. The injection nozzle 5B is in contact with the injection nozzle attachment block 73, and is indirectly provided in the heating cylinder 19B. Similar to the first illustrative embodiment (see FIG. 2), the injection nozzle 5B is attached to the heating cylinder 19B with the flange portion 28 being pressed by the cylinder head 30. In the third illustrative embodiment, the rear end portion temperature sensor 32 is also provided without forming a hole in the attachment fixing member to which the injection nozzle 5B is attached, that is, the cylinder head 30.

Although the invention made by the present inventor has been specifically described above based on the illustrative embodiments, it is needless to say that the present invention is not limited to the illustrative embodiments described above, and various modifications can be made without departing from the scope of the invention. The above-described plurality of examples may be appropriately combined.

What is claimed is:

1. An injection nozzle to be attached to a tip end of a heating cylinder of an injection device by a predetermined attachment fixing member, the injection nozzle comprising:

a rear end portion temperature sensor configured to measure a temperature in a rear end portion of the injection nozzle to be attached to the heating cylinder, wherein the injection nozzle has a groove of a predetermined length formed in an outer peripheral surface from a vicinity of the rear end portion toward a tip end of the injection nozzle in a longitudinal direction, and a sensor hole of a predetermined depth formed in the vicinity of the rear end portion continuously from the groove, wherein at least a part of the rear end portion in which the sensor hole is formed is configured to be received in the attachment fixing member when the injection nozzle is attached to the heating cylinder, wherein the rear end portion temperature sensor includes a sensor device at a distal end and a conductive wire portion, the sensor device being inserted into the sensor hole, and the conductive wire portion being housed along the groove near the distal end and extending outwardly in a vicinity of a central portion of the injection nozzle, and wherein the groove extends from the sensor hole toward the tip end of the injection nozzle such that the conductive wire portion is routed from the sensor hole toward the vicinity of the central portion.

2. The injection nozzle according to claim 1, wherein the injection nozzle is formed with a flange portion having an enlarged diameter at the rear end portion, and the injection nozzle is attached to the heating cylinder by the attachment fixing member pressing the flange portion toward the heating cylinder.

3. The injection nozzle according to claim 2, wherein the sensor hole is formed near the flange portion.

4. The injection nozzle according to claim 1, wherein the injection nozzle has an oblique hole extending from the outer peripheral surface to an internal resin flow path, and a tip end of a needle valve driven to move forward and backward being inserted into the hole to open and close the resin flow path.

5. An injection device comprising:

a heating cylinder;

a screw placed in the heating cylinder; and an injection nozzle attached to a tip end of the heating cylinder by a predetermined attachment fixing member, wherein the injection nozzle includes a rear end portion temperature sensor configured to measure a temperature in a rear end portion attached to the heating cylinder, wherein the injection nozzle has a groove of a predetermined length formed in an outer peripheral surface from a vicinity of the rear end portion toward a tip end of the injection nozzle in a longitudinal direction, and a sensor hole of a predetermined depth formed in the vicinity of the rear end portion continuously from the groove, wherein at least a part of the rear end portion in which the sensor hole is formed is configured to be received in the attachment fixing member when the injection nozzle is attached to the heating cylinder, wherein the rear end portion temperature sensor includes a sensor device at a distal end and a conductive wire portion, the sensor device being inserted into the sensor hole, and the conductive wire portion being housed along the groove near the distal end and extending outwardly in a vicinity of a central portion of the injection nozzle, and wherein the groove extends from the sensor hole toward the tip end of the injection nozzle such that the conductive wire portion is routed from the sensor hole toward the vicinity of the central portion.

6. The injection device according to claim 5, wherein the injection nozzle is formed with a flange portion having an enlarged diameter at the rear end portion, and the injection nozzle is attached to the heating cylinder by the flange portion being pressed toward the heating cylinder by the attachment fixing member.

7. The injection device according to claim 6, wherein the sensor hole is formed near the flange portion.

8. The injection device according to claim 6, wherein a female thread is formed on a tip end side of the heating cylinder, wherein a male thread is formed on an outer peripheral surface of the attachment fixing member, and wherein the injection nozzle is attached to the heating cylinder by the flange portion being pressed toward the heating cylinder by the attachment fixing member and the male thread being fastened to the female thread.

9. The injection device according to claim 6, wherein a tapped hole is formed in an end surface of a tip end of the heating cylinder, and wherein the injection nozzle is attached to the heating cylinder by the flange portion being pressed by the attachment fixing member, and the attachment fixing member being fixed to the heating cylinder by a bolt fastened in the tapped hole.

10. The injection device according to claim 5, further comprising:

a needle valve; and a drive mechanism configured to drive the needle valve, wherein the injection nozzle has an oblique hole extending from the outer peripheral surface to an internal resin flow path, and wherein the needle valve is inserted into the hole and driven to move forward and backward by the drive mechanism to open and close the resin flow path.

11. An injection molding machine comprising:

an injection device; and a mold clamping device, wherein the injection device includes:

a heating cylinder;

a screw placed in the heating cylinder; and an injection nozzle attached to a tip end of the heating cylinder by a predetermined attachment fixing member, wherein the injection nozzle includes a rear end portion temperature sensor configured to measure a temperature in a rear end portion attached to the heating cylinder, wherein the injection nozzle has a groove of a predetermined length formed in an outer peripheral surface from a vicinity of the rear end portion toward a tip end of the injection nozzle in a longitudinal direction, and a sensor hole of a predetermined depth formed in the vicinity of the rear end portion continuously from the groove, wherein at least a part of the rear end portion in which the sensor hole is formed is configured to be received in the attachment fixing member when the injection nozzle is attached to the heating cylinder, wherein the rear end portion temperature sensor includes a sensor device at a distal end and a conductive wire portion, the sensor device being inserted into the sensor hole, and the conductive wire portion being housed along the groove near the distal end and extending outwardly in a vicinity of a central portion of the injection nozzle, and wherein the groove extends from the sensor hole toward the tip end of the injection nozzle such that the conductive wire portion is routed from the sensor hole toward the vicinity of the central portion.

12. The injection molding machine according to claim 11, wherein the injection nozzle is formed with a flange portion having an enlarged diameter at the rear end portion, and the injection nozzle is attached to the heating cylinder by the flange portion being pressed toward the heating cylinder by the attachment fixing member.

13. The injection molding machine according to claim 12, wherein the sensor hole is formed near the flange portion.

14. The injection molding machine according to claim 12, wherein a female thread is formed on a tip end side of the heating cylinder, wherein a male thread is formed on an outer peripheral surface of the attachment fixing member, and wherein the injection nozzle is attached to the heating cylinder by the flange portion being pressed toward the heating cylinder by the attachment fixing member and the male thread being fastened by the female thread.

15. The injection molding machine according to claim 12, wherein a tapped hole is formed in an end surface of a tip end of the heating cylinder, and wherein the injection nozzle is attached to the heating cylinder by the flange portion being pressed by the attachment fixing member, and the attachment fixing member being fixed to the heating cylinder by a bolt fastened in the tapped hole.

16. The injection molding machine according to claim 11, wherein the injection device includes:

a needle valve; and a drive mechanism configured to drive the needle valve, and wherein the injection nozzle has an oblique hole extending from the outer peripheral surface to an internal resin flow path, and the needle valve is inserted into the hole and driven to move forward and backward by the drive mechanism to open and close the resin flow path.

* * * * *